Nov. 12, 1957 D. RICHMAN 2,813,147

MULTIPURPOSE CONTROL SYSTEM FOR A COLOR-TELEVISION RECEIVER

Filed June 16, 1955 2 Sheets-Sheet 1

MULTIPURPOSE CONTROL SYSTEM FOR A COLOR-TELEVISION RECEIVER

Filed June 16, 1955 2 Sheets-Sheet 2

2,813,147

MULTIPURPOSE CONTROL SYSTEM FOR A COLOR-TELEVISION RECEIVER

Donald Richman, Fresh Meadows, N. Y., assignor to Hazeltine Research, Inc., Chicago, Ill., a corporation of Illinois Application June 16, 1955, Serial No. 515,904

12 Claims. (Cl. 178—5.4)

*General*

This invention relates to a multipurpose control system for a color-television receiver and, more particularly, to a control system for improving the sensitivity of the phase-control circuits of the color-synchronizing system of such a receiver. Specifically, a multipurpose control system, in accordance with the present invention, increases the intensity of the color burst synchronizing signal applied to such phase-control circuits and, additionally, increases the intensity of the phase-control potential developed in such phase-control circuits when the color reference oscillator in the receiver is not synchronized.

In an NTSC type of color-television receiver, a locally generated signal having different phases, as applied to different synchronous detectors, is heterodyned in such detectors with a received subcarrier wave signal modulated at specific phases by different color components to derive such components therefrom. In order that such components be faithfully derived, the phases of the locally generated signal, as applied to the different synchronous detectors, are controlled by means of a received color-synchronizing or burst signal. This phase control may be effected by means of a conventional automatic-phase-control circuit or, preferably, by means of more elaborate circuits having a higher degree of control and stability such as described in an article entitled "The D. C. quadricorrelator: A two-mode synchronization system," at pages 288–299, inclusive, of the January 1954 issue of the Proceedings of the I. R. E. In either of the above types of control circuits the phases of the color-synchronizing signal and of the locally generated signal are compared to develop a control potential. This control potential is applied to the color reference oscillator, which develops the locally generated signal, to adjust the frequency and phase thereof until the locally generated and color-synchronizing signals have a specific phase relationship.

The response of the phase-control circuits desired to effect and maintain synchronization of the color reference oscillator differs widely for the two conditions. To effect synchronization, the pull-in range of the phase-control circuits should be reasonably wide and the sensitivity high. To maintain synchronization once effected, the noise band width, in other words, the frequency range over which the phase-control circuits will operate should be exceptionally narrow, of the order of 100 cycles, and the sensitivity low in order to obtain rigid control and stability of operation. The two-mode synchronization system described in the above-mentioned I. R. E. article provides the different responses for the two conditions. In such synchronization system, when the color reference oscillator is synchronized, a conventional highly stable phase control is employed. However, when the color reference oscillator is not synchronized as, for example, when a television signal is initially received or receiver television channels are changed, the synchronization system, among other things, causes the effectiveness of the color burst synchronizing signal to be greatly increased and the magnitude of the frequency-control potential to be greater than conventionally obtainable. As a result, the response of the synchronization system becomes highly sensitive when the reference oscillator is not synchronized and relatively insensitive and highly stable when such oscillator is synchronized.

In prior embodiments of such two-mode synchronization system, separate amplifiers have been used to bring about the change in the effectiveness of the color burst signal and the increase in the magnitude of the frequency-control potential. It is desirable to combine the operations of these two amplifiers into one to provide a pair of output signals to effect the two purposes just described. In accordance with the present invention, such a composite amplifier is provided as part of a multipurpose control system.

It is, therefore, an object of the present invention to provide a multipurpose control system for improving the operation of the color-synchronizing system of a color-television receiver which avoids one or more of the disadvantages and limitations of prior such control systems.

It is a further object of the present invention to provide a new and improved multipurpose control system for the color-synchronizing system of a color-television receiver which performs the dual functions of controlling the gain of the chrominance channel and the sensitivity of the color-synchronizing system.

It is a still further object of the present invention to provide a new and improved multipurpose control system for the color-synchronizing system of a color-television receiver which is relatively simple and inexpensive.

In accordance with the present invention, a multipurpose control system for a color-television receiver comprises means for supplying a locally generated signal of controllable phase and a color burst synchronizing signal of reference phase. The control system also includes phase-detection means responsive to the supplied signals for developing therefrom one heterodyne signal representative of the in-phase and another heterodyne signal representative of the quadrature-phase relationship of the supplied signals and includes means for supplying a gating pulse substantially coincident with the burst signal. Additionally, the control system includes an amplifier responsive to the gating pulse and the one heterodyne signal and having a pair of output circuits. The control system also includes means for conditioning the amplifier when the supplied signals are at different frequencies to be conductive for developing an amplified gating pulse in one of the output circuits and for developing the one heterodyne signal in the other output circuit. Additionally, the control system includes means for utilizing the amplified gating pulse to increase the intensity of the supplied color burst signal for improving the operation of the phase-detection means when the supplied signals are at different frequencies. Finally, the control system includes means for combining the one heterodyne signal developed in the other output circuit and the other heterodyne signal to develop a frequency-control signal when the supplied signals are at different frequencies.

For a better understanding of the present invention, together with other and further objects thereof, reference is had to the following description taken in connection with the accompanying drawings, and its scope will be pointed out in the appended claims.

Referring to the drawings.

Figure 1:
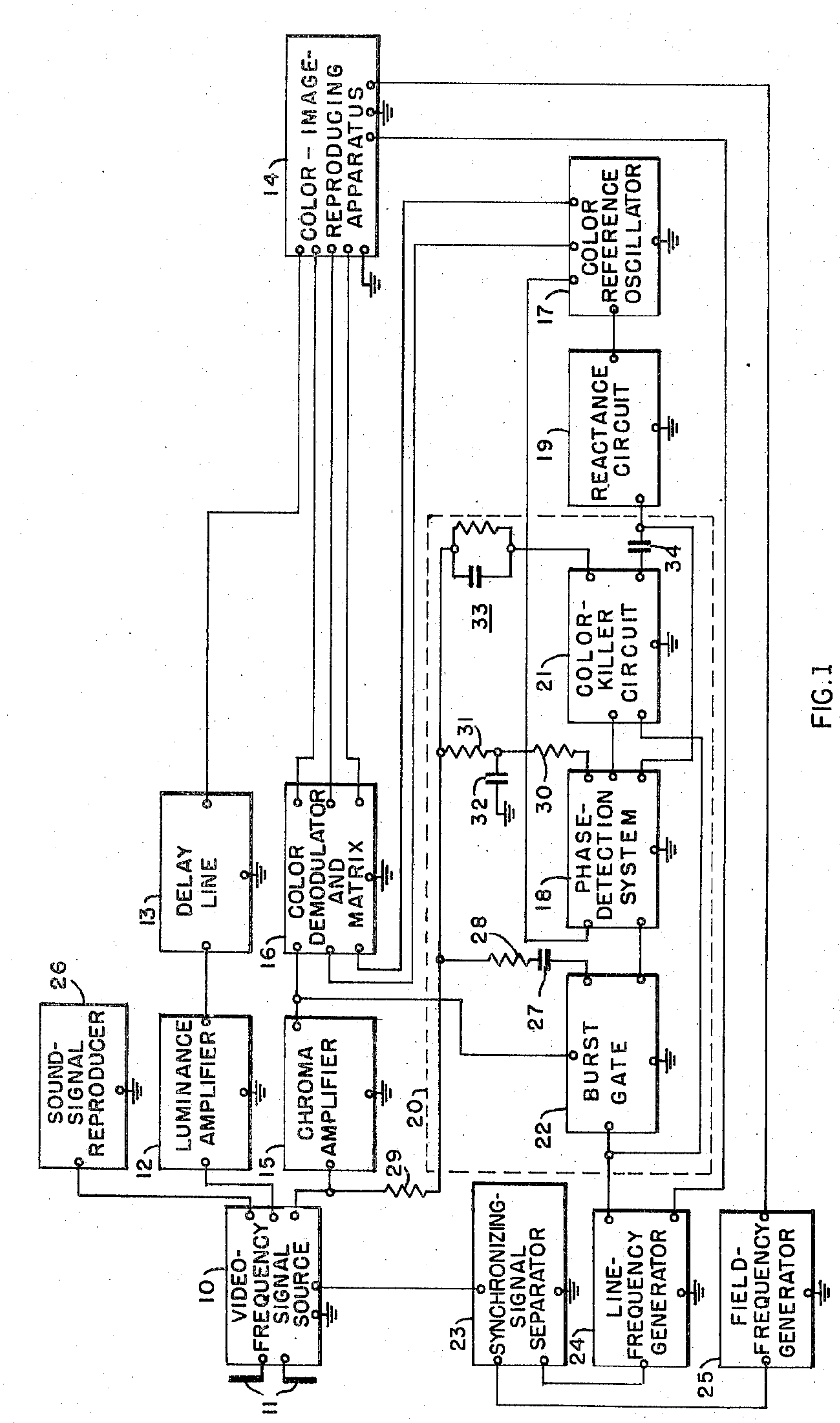
Fig. 1 is a schematic diagram of a color-television receiver including a multipurpose control system constructed in accordance with the present invention.

*General description of color-television receiver of Fig. 1*

Referring now to Fig. 1 of the drawings, there is represented a color-television receiver suitable for utilizing an NTSC type of color-television signal. The receiver includes a video-frequency signal source 10 which may be conventional equipment for supplying an NTSC type of composite video-frequency signal, for example, it may comprise a radio-frequency amplifier having an input circuit coupled to an antenna 11, an oscillator-modulator, an intermediate-frequency amplifier, and a detection system for deriving the video-frequency signal. An output circuit of the video-frequency signal source 10 is coupled through a luminance channel including, in cascade in the order named, a luminance amplifier 12 and a delay line 13 to an input circuit of a color-image-reproducing apparatus 14. The amplifier 12 may be a conventional wide band amplifier, for example, having a pass band of approximately 0–4.2 megacycles, and the delay line 13 may be a conventional line proportional to equalize the time of translation of the luminance signal through the amplifier 12 and the line 13 with that for translation of the chrominance signal through a chrominance channel to be discussed hereinafter. The color-image-reproducing apparatus 14 may be of conventional construction, for example, many comprise a three-gun multipurpose cathode-ray tube of the so-called shadow-mask type now employed in many color-television receivers.

An output circuit of the video-frequency signal source 10 is also coupled through a chrominance channel to input circuits of the color-image-reproducing apparatus 14. Such chrominance channel may include, in cascade in the order named, a chroma amplifier 15 and a color demodulator and matrix circuit 16 having three output circuits individually coupled to three input circuits of the image-reproducing apparatus 14. A pair of input circuits of the unit 16 is individually coupled to a pair of output circuits of a color reference oscillator 17. The chroma amplifier 15 may be of conventional construction for translating a component of the video-frequency signal, for example, that portion of the video-frequency signal including the subcarrier wave signal modulated at specific phases by color-signal components. Such subcarrier wave signal has a mean frequency of approximately 3.58 megacycles and the side bands thereof usually extend from 2.0 to 4.2 megacycles. Therefore, the amplifier 15 may have a pass band of the order of 2.0–4.2 megacycles. The color demodulator and matrix circuit 16 may also be of conventional construction including a plurality of synchronous detectors and a signal-matrixing system for developing, for example, colors representative of the green, red, and blue components of a televised image for application to the image-reproducing apparatus 14.

The chrome amplifier 15 is also coupled as a unit in a gain-control circuit loop including a burst gate 22, a balanced phase-detection system 18, a color-killer circuit 21, a low-pass filter 33, and an isolating resistor 29 to effect control of the gain of the amplifier 15 in a manner to be described more fully hereinafter. The units 18, 21, 22, and 33 are parts of a multipurpose control system 20 constructed in accordance with the present invention and to be described more fully hereinafter. The gate 22 is connected in a shortened part of the control loop by means of the series circuit of a condenser 27, a resistor 28, and the resistor 29. The detector 18 is responsive to the signal developed in the oscillator 17 to control the phase of this signal by means of the reactance circuit 19 and is also connected in another shortened part of the control loop by means of the series circuit of resistors 30, 31 and 29. A by-pass condenser 32 is coupled between the junction of the resistors 30 and 31 and chassis-ground. An output circuit of the color-killer circuit 21 is coupled through a condenser 34 to the reactance circuit 19.

Another output circuit of the video-frequency signal source 10 is coupled through a synchronizing-signal separator 23 to input circuits of a line-frequency generator 24 and a field-frequency generator 25, the output circuits of the latter units being coupled to horizontal and vertical deflection windings in the color-image-reproducing apparatus 14. Additionally, an output circuit of the generator 24, for example a terminal on the horizontal deflection transformer therein, is coupled to input circuits of the brust gate 22 and of the color-killer circuit 21.

A fourth output circuit of the video-frequency signal source 10 is coupled to a sound-signal reproducer 26 which may comprise a conventional intermediate-frequency amplifier, an audio-frequency amplifier, and a sound reproducer such as a loudspeaker.

Except for the details of the control system 20 to be considered more fully hereinafter, all of the circuit components described above and their combinations are conventional and well known. Therefore, no detailed description of such circuit components is provided herein.

*General operation of color-television receiver of Fig. 1*

Considering briefly now the operation of the receiver of Fig. 1 as a whole and assuming for the present that the multipurpose control system 20 is a conventional balanced phase-detection system, a desired composite color-television signal of the NTSC type is intercepted by the antenna system 11, selected, amplified, converted to an intermediate-frequency signal, further amplified, and the composite video-frequency signal component thereof detected in the unit 10. Such composite video-frequency signal comprises conventional line- and field-synchronizing components, a color burst synchronizing component, and luminance and chrominance signals. The luminance signal, being substantially the same as a conventional monochrome signal, is amplified in the unit 12, delayed in time in the unit 13, and applied to the color-image-reproducing apparatus 14. The chrominance signal, specifically the modulated subcarrier wave signal and its side bands, is amplified in the unit 15 and applied to the demodulator and matrix circuit 16. In the unit 16 modulation components of the subcarrier wave signal, for example, the conventional I and Q components may be derived by synchronous detection employing properly phased signals from the output circuits of the oscillator 17. The derived I and Q components are then matrixed to $R-Y$, $B-Y$, and $G-Y$ color-difference signals representative, respectively, of the red, blue, and green components of the televised color image. These color-difference signals are applied to the color-image-reproducing apparatus 14 to combine therein with the luminance signal to reproduce the televised image in color.

The signals developed in the oscillator 17 and applied to the detector unit 18 are maintained in proper phase relation with respect to the modulated subcarrier wave signal so that the proper color-difference signals will be derived. To effect this result, in a manner to be explained more fully hereinafter, the balanced phase-detection system 18 compares the phase of a signal developed in the oscillator 17 with that of a color burst synchronizing signal applied to the system 18 through the burst gate 22 from an output circuit of the amplifier 15. Any deviation of the phasing of the signals developed in the oscillator 17 from a specific phase relation results in the developing of a control signal in an output circuit of the phase-detection system 18. This control signal is employed by means of the reactance circuit 19 to eliminate such misphasing. In a manner to be explained more fully hereinafter, signals developed in the burst gate 22 and the phase-detection system 18 are also utilized to control the gain of the chroma amplifier 15 to effect automatic gain control of the chrominance and burst signals and for other purposes. An output signal of the phase-detection system 18 is also employed in the color-killer circuit 21 to develop a bias potential which renders the chroma amplifier 15 nonconductive except when a burst signal is being received and the color reference oscillator is synchronized and, when it is synchronized, maintains the chroma amplifier continuously conductive. A signal developed in the circuit 21 is applied to the reactance circuit 19 to increase the control potential applied thereto when the oscillator 17 is not synchronized.

In the synchronizing-signal separator 23 the line- and field-synchronizing signals are separated from the composite video-frequency signal and from each other and are utilized, respectively, in the generators 24 and 25 to develop horizontal and field deflection signals. The latter signals are employed in the deflection windings of the apparatus 14 to cause the electron beam of such apparatus to scan a raster on the image screen thereof. A negative flyback pulse developed in, for example, the horizontal deflection transformer in the generator 24 is applied through the burst gate 22 to the phase-detection system 18 and directly to the color-killer circuit 21 to cause such units to be operative to develop their different control potentials substantially only during that period when the color burst signal is present.

In addition to the picture signal, a sound signal is also intercepted and an intermediate-frequency sound signal developed in the source 10. Such intermediate-frequency sound signal is then further amplified in the sound-signal reproducer 26 and the audio-frequency components thereof are detected and additionally amplified and utilized to reproduce sound in the unit 26.

*Description of multipurpose control system of Fig. 1*

Figure 2:
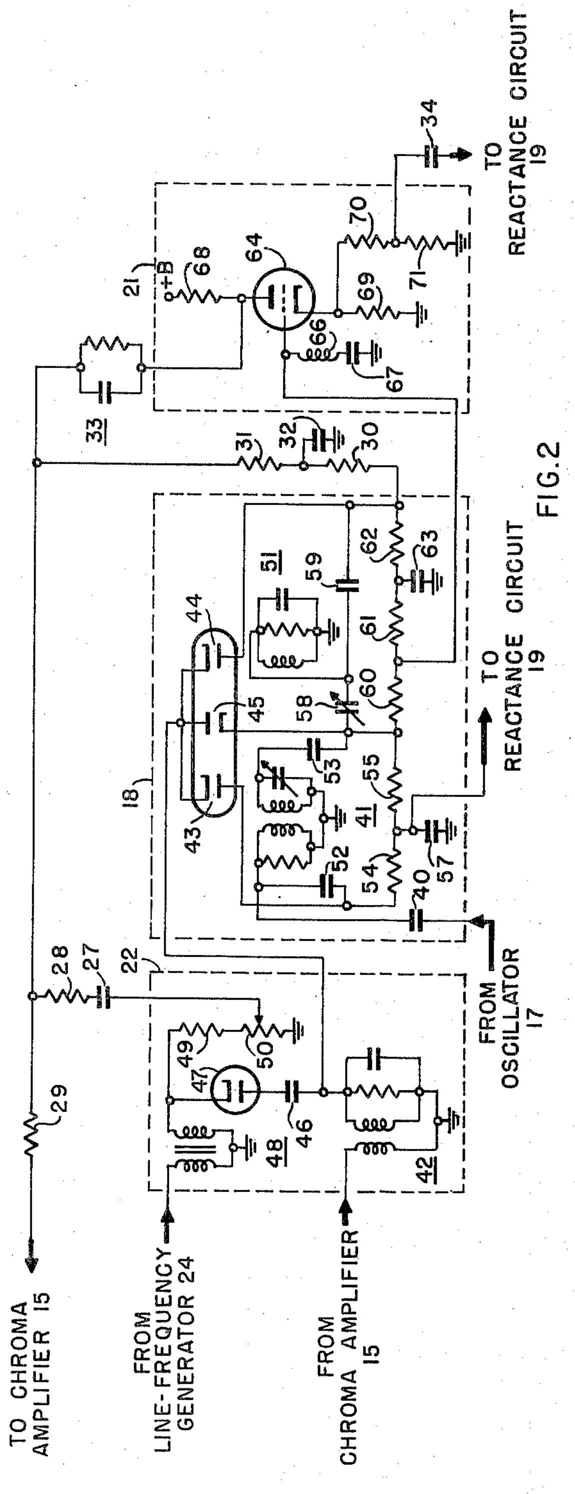
Fig. 2 is a detailed circuit diagram of one embodiment of such control system.

Considering now in detail an embodiment of the multipurpose control system 20 of Fig. 1, specifically the embodiment represented in Fig. 2, such system comprises means for supplying a locally generated signal of controllable phase and a color burst synchronizing signal of reference phase. More specifically, such supply means comprises the conductor connecting an output circuit of the color reference oscillator 17 through a condenser 40 to a bifilar transformer 41 in the phase-detection system 18 for supplying the locally generated signal of controllable phase. The supply means further includes the burst gate 22 having the primary winding of a bifilar transformer 42 coupled to the output circuit of the chroma amplifier 15. The secondary winding of the transformer 42, broadly tuned to the frequency of the color burst synchronizing signal, is coupled to the interconnected cathodes of diodes 43 and 44 and the anode of diode 45 in the phase-detection system 18 for supplying a color burst synchronizing signal of reference phase. A series circuit of an isolating condenser 46, a diode 47, and the secondary winding of a transformer 48 is coupled in parallel with the secondary winding of the transformer 42. The primary winding of the transformer 48 is connected to a source of negative-going flyback pulse, for example, to a tap on the deflection transformer in the line-frequency generator 24. A series circuit of resistor 49 and variable resistor 50 is connected in parallel with the secondary winding of the transformer 48. The resistor 50 provides chroma gain control, the variable tap thereof being connected through the condenser 27, the resistor 28, and the resistor 29 to a gain-control circuit of the chroma amplifier 15.

The multipurpose control system also includes phase-detection means, specifically the phase-detection system 18, responsive to the color burst and locally generated signals for developing one heterodyne signal representative of the in-phase and another heterodyne signal representative of the quadrature-phase relationship of the supplied signals. More specifically, the phase-detection means includes, in addition to other circuit elements to be described, the diodes 43, 44, and 45, the bifilar transformer 41, and a resonant circuit 51 broadly tuned to the frequency of the locally generated signal. Both windings of the bifilar transformer 41 are also broadly tuned to the same frequency. The primary winding of the transformer 41 is coupled to the anode of the diode 43 through a condenser 52 while the secondary winding of this transformer is similarly coupled through a condenser 53 to the cathode of the diode 45. This anode and cathode are further intercoupled by means of a pair of load resistors 54, 55, the junction of which is connected to an output condenser 57. The resonant circuit 51 is coupled through a phase-adjusting condenser 58 to the cathode of the diode 45 and through another condenser 59 to the anode of the diode 44. A series circuit of three load resistors 60, 61, and 62 interconnects the cathode of the diode 45 and the anode of the diode 44, with the junction of the resistors 61 and 62 connected to an output condenser 63 and the junction of the resistors 60 and 61 connected to the grid of a triode 64 in the color-killer circuit 21. The anode of the diode 44 is coupled through the resistors 30, 31, and 29 to the previously mentioned gain-control circuit of the chroma amplifier 15. As more fully explained in applicant's copending application Serial No. 496,171, filed March 23, 1955, entitled "Balanced Phase-Detection System," the phase-detection system 18 includes in-phase and quadrature-phase detection circuits for developing across the condenser 57 an automatic-phase-control potential and at the junction of the resistors 60, 61 a signal representative of the in-phase condition of the color burst and locally generated signals when the oscillator 17 is synchronized. The bifilar transformer 41 and the resonant circuit 51 provide means for adjusting the relative phase relations of the signals applied to the diodes 43, 44, and 45. The condensers 52, 53, 58, and 59 provide both phase-adjusting means and signal-isolating devices for the purpose of preventing the unidirectional potentials developed in the resistor circuits 54, 55, 60, 61, and 62 from being applied to the transformer 41 and the resonant circuit 51. The junction of the resistors 60 and 61 is selected to be at an impedance point slightly to one side of the balance point at the junction of the resistors 61 and 62 to provide both a unidirectional potential representative of the in-phase relationship of the color burst and locally generated signals when the oscillator 17 is synchronized and to provide a heterodyne signal resulting from the beating of the latter signals when the oscillator is not synchronized.

The control system also includes means for supplying a gating pulse substantially coincident with the color burst synchronizing signal, specifically, the series circuit of an inductor 66, which is a winding on the deflection transformer in the line-frequency generator 24, and a condenser 67 coupled as an input circuit to the grid of the tube 64 in the color-killer circuit 21.

The control system also includes an amplifier responsive to the gating signal and to the one heterodyne signal and having a pair of output circuits. Specifically, such amplifier comprises the color-killer circuit 21 having the grid of the triode 64 therein responsive to the heterodyne signal developed at the junction of the resistors 60, 61 in the phase-detection system 18 when the oscillator 17 is not synchronized and responsive to the negative-going gating signal developed across the inductor 66. The triode 64 has a pair of output circuits. One of these is an anode output circuit including a load resistor 68 connected between the anode and a source of positive potential +B and coupled through the filter network 33 and the resistor 29 to the aforementioned gain-control circuit of the chroma amplifier 15. The other is a cathode output circuit comprising an impedance-matching load circuit including a load resistor 69 coupled between the cathode and chassis-ground and a pair of series-connected load resistors 70 and 71 in parallel with the resistor 69. The junction of the resistors 70 and 71 is coupled through the condenser 34 to the input circuit of the reactance circuit 19.

The control system further includes means for conditioning the amplifier when the supplied signals are at different frequencies to be conductive for developing an amplified gating pulse in one of the output circuits and for developing the one heterodyne signal in the other output circuit. More specifically, such means comprises the direct connection of the grid of the tube 64 to the junction of the resistors 60 and 61 for providing a unidirectional bias on such grid slightly positive with respect to ground when the supplied signals are at different frequencies. The amplified gating pulse supplied to the grid of the tube 64 appears in the anode circuit of such tube and the one heterodyne signal appears in the cathode circuit of such tube when such bias potential is applied to the grid.

The control system further includes means for utilizing the amplified gating pulse to increase the intensity of the supplied color burst signal for improving the operation of the phase-detection means when the supplied signals are at different frequencies. More specifically, such means comprises the circuit connecting the anode of the triode 64 to the gain-control circuit of the chroma amplifier 15 to increase the gain of such amplifier and thereby increase the intensity of the color burst signal translated therethrough when the locally generated and color burst signals are not synchronized.

Finally, the control system includes means for combining the one heterodyne signal developed in the cathode output circuit of the triode 64 and the heterodyne signal developed across the condenser 57 in the phase-detection system 18 to develop a control signal for the reactance circuit 19 when the supplied signals are at different frequencies. More specifically, such combining means comprises the common input circuit of the reactance circuit 19 to which the signal developed in the cathode circuit of the tube 64 and the signal developed across the condenser 57 are applied.

*Operation of multipurpose control system of Fig. 2*

In considering the operation of the control system of Fig. 2 it will be beneficial initially to consider the operation of the burst gate 22, the phase-detection system 18, and the color-killer circuit 21 broadly before considering the detailed operation of these units.

The phase-detection system 18, in addition to developing phase-control and other signals to be considered more fully hereinafter, develops a biasing potential which is applied through the resistors 30, 31, and 29 to the gain-control circuit of the amplifier 15. The magnitude of this potential is determined by the amplitude of the color burst synchronizing signal applied to the unit 18. This bias potential or automatic-chrominance-control (ACC) potential is negative when the color burst signal for any reason, such as nonreception of a color signal, is not applied to the system 18 to bias the chroma amplifier 15 beyond cutoff. The ACC potential is less negative or slightly positive when a color burst synchronizing signal is present and applied to the unit 18 to bias the chroma amplifier 15 to a conductive state when color signals are being received. The unit 22 is a gate conductive only during the period of the color burst signal for applying such signal to the unit 18. In addition, in order to control the level of the chrominance signal translated through the amplifier 15, the gate 22 develops a positive pulse of controllable amplitude during the period of the color burst signal. This positive pulse is applied to the gain-control circuit of the chroma amplifier 15 through a manually controlled variable resistor 50 to provide any desired amount of increased gain in such amplifier during the period of the color burst signal to amplify such signal. Since the grid-cathode circuit of the chroma amplifier sets the peaks of the burst signals at the potential at which grid-cathode current tends to flow and the unit ACC provides an automatic bias potential for the amplifier 15 determined by the amplitude of the burst signal, any increase in amplitude of such signal obtained by adjusting the amplitude of the positive pulse applied to the amplifier 15 by the unit 22 results in depressing the maximum level of the chrominance signal out of the amplifier 15 and provides chrominance control.

As described in the last paragraph, when no burst signal is present, a negative ACC potential is developed by unit 18 and applied to the chroma amplifier 15 rendering such amplifier nonconductive. However, in order that the phase-detection system 18 respond when a color burst signal initially appears, the chroma amplifier 15 should be conductive during the flyback period of the horizontal pulse so that any burst signal present in the receiver will be translated through the chroma amplifier 15, the gate 22, and applied to the phase-detection system 18 to synchronize the oscillator 17. To effect this result, the triode 64 in the unit 21 becomes conductive only when no color burst signal is being received and the oscillator 17 is, therefore, not synchronized. Positive-going pulses of relatively high amplitude are developed in the anode circuit of the triode 64 during the horizontal flyback period and are applied to the gain-control circuit of the chroma amplifier 15. These pulses cause such amplifier to have maximum gain during their duration. Consequently, any color burst signal applied to the amplifier 15 at such time is translated through the amplifier 15 with maximum amplification and applied through gate 22 to the detection system 18 to cause an ACC potential to be developed therein and to cause the oscillator 17 to be quickly synchronized. In addition, in order that the oscillator 17 may be even more quickly synchronized, a heterodyne signal, developed in the phase-detection system 18 from the beating of the color burst and locally generated signals applied thereto due to the nonsynchronous operation of the oscillator 17, is developed with increased power in the cathode circuit of the triode 64. This signal is combined with the conventional automatic-phase-control potential to provide a control potential of increased magnitude which is applied to the reactance circuit 19 quickly to bring the oscillator 17 into synchronism.

Considering now the details of operation of the units 22, 18, and 21, the burst gate 22 utilizes a negative flyback pulse from the line-frequency generator 24 to control the application of the burst to the cathodes of the diodes 43 and 44 and the anode of the diode 45 in the phase-detection system 18. The burst gate 22 also utilizes a selected amplitude portion of the flyback pulse for application through the condenser 27, the resistor 28, and the resistor 29 to the gain-control circuit of the chroma amplifier 15 to control the gain of such amplifier during the duration of the flyback pulse so that the color burst signal, if present, may be translated therethrough with such amplification as to provide the desired chroma control. More specifically, the diode 47 provides a low-impedance shunt across the secondary winding of the transformer 42 except when the positive flyback pulse applied to the cathode thereof from the secondary winding of the transformer 48 causes the diode 47 to be nonconductive. Therefore, during the duration of the flyback pulse, the color burst signal is translated through the transformer 42 and applied to the three diodes in the unit 18. The voltage divider 50 selects a portion of the positive pulse and applies it to the grain-control circuit of the chroma amplifier 15 to provide chrominance control.

In the unit 18, the locally generated signal is translated through condenser 40 and applied to the primary winding of the bifilar transformer 41 and through the condenser 52 to the anode of the diode 43 with a specific phase and magnitude when the oscillator 17 is properly synchronized. The locally generated signal is also applied by the secondary winding of the transformer 41 through the condenser 53 to the cathode of the diode 45 with a specific phase and magnitude when the oscillator 17 is synchronized. The signal on the cathode of the diode 45 is also applied through the condenser 58 to the resonant circuit 51 and through the condenser 59 to the anode of the diode 44 with another specific phase and magnitude. The phases and magnitudes of these signals are fully considered in applicant's above-mentioned copending application Serial No. 496,171. In general, they are such as to cause the diodes 43 and 45 to operate as a quadrature-phase detector and the diodes 44 and 45 to operate as an in-phase detector such as more fully discussed in the article in the January 1954 Proceedings of the I. R. E. previously mentioned herein. The average unidirectional currents flowing in the diodes 43 and 45 develop potentials across the resistors 54 and 55. The potential developed at the junction of these resistors across the output condenser 57, as more fully described in the above-mentioned copending application, is the quadrature-phase control potential or automatic-phase-control (APC) potential applied to the reactance circuit 19. Similarly, the average unidirectional currents flowing in the diodes 44 and 45 develop potentials across the resistors 60, 61, and 62 with the balance point for these potentials being at the junction of the resistors 61 and 62. At this point, a balanced in-phase control potential is developed, as more fully described in the above-mentioned copending application. At a point slightly removed from the balance point, specifically at the junction of the resistors 60 and 61, a portion of the same in-phase potential is available and, in addition, because the junction of the resistors 60 and 61 is at an unbalance point, any heterodyne signal developed as a result of a beating of the signals applied to the diodes 44 and 45 also appears. In addition, the diode 44, responsive to both the color burst and locally generated signals, acts as a simple peak detector for the larger amplitude color burst signal. The peak detected potential developed at the junction of the anode of the tube 44 and the resistor 62 varies in magnitude with variations in the intensity of the color burst signal applied to the cathode of the diode 44. This variation in magnitude is averaged by means of the resistors 30 and 31 and the condenser 32 and applied through the resistor 29 to the gain-control circuit of the chroma amplifier 15 as the automatic-chrominance-control (ACC) potential previously discussed.

The heterodyne signal, if any, developed at the junction of the resistors 60 and 61 is applied to the grid of the triode 64 in the unit 21. A negative-going flyback pulse is also applied by means of the inductor 66 to the same grid. If the oscillator 17 is synchronized, a maximum negative potential is developed at the balance point at the junction of the resistors 61 and 62, as in the in-phase detector described in the aforesaid I. R. E. article, and the potential developed at the junction of the resistors 60 and 61 will be, for example, −15 volts. If the oscillator 17 is not synchronized, zero potential is developed at the balance point and a slightly positive potential, for example approximately +2 volts, is developed at the unbalance point at the junction of the resistors 60 and 61. Thus, the triode 64 has a bias on the control electrode thereof of, for example, +2 volts when the oscillator 17 is not synchronized and of, for example, −15 volts if it is synchronized. The −15 volt bias is sufficient to cause the tube 64 to be cut off and, therefore, no signals are developed in either the anode or cathode circuits of this tube when the oscillator 17 is synchronized. However, when the oscillator 17 is not synchronized and a bias potential of, for example, +2 volts is applied to the grid of the tube 64, the negative-going flyback pulse applied to the same grid appears as an amplified positive-going flyback pulse in the anode circuit of this tube and is applied as such to the gain-control circuit of the chroma amplifier 15. As a result, the gain of such amplifier is greatly increased during the duration of such pulse and the intensity of any color burst signal then present is greatly amplified prior to application to the phase-detection system 18. This provides more sensitive response of the phase-detection system 18 and results in more rapid synchronization. Additionally, a heterodyne signal is developed at the junction of the resistors 60 and 61 when the locally generated and color burst signals are not synchronized and this heterodyne signal is applied to the grid of the tube 64. Another heterodyne signal representative of the nonsynchronous relationship of the locally generated and color burst signals is also developed across the condenser 57 in the detection system 18 at such time. The heterodyne signal applied to the grid of the triode 64 is current-amplified in the cathode circuit of this tube and applied through the condenser 34 to the reactance circuit 19 wherein it combines with the heterodyne signal developed across the condenser 57 to develop an average control potential much greater in magnitude than would be developed if only the heterodyne signal across the condenser 57 was utilized. The magnified control potential acting on the reactance circuit 19 more quickly brings the oscillator 17 into synchronism.

To summarize the operation of the multipurpose control system of Fig. 2, the triode 64 in the unit 21, under the control of signals from the phase-detection system 18, performs multiple control functions when the oscillator 17 is not synchronized. When the oscillator 17 is synchronized, the unit 21 is dormant. When the oscillator 17 is not synchronized, the unit 21 becomes active and an amplified positive-going pulse occurring in coincidence with any color burst signal is developed in the anode circuit of the tube 64 and applied to the chroma amplifier 15 to cause such amplifier to have maximum gain for the duration of the pulse. At the same time, a heterodyne signal, developed by the beating of the color burst and locally generated signals in the phase-detection system 18, is current-amplified in the cathode circuit of the tube 64 and combined with the conventional APC potential to improve the pull-in of the oscillator 17. These operations combine to cause the oscillator 17 more quickly to be synchronized and tend to increase the pull-in range of the phase-detection system 18.

Figure 3:
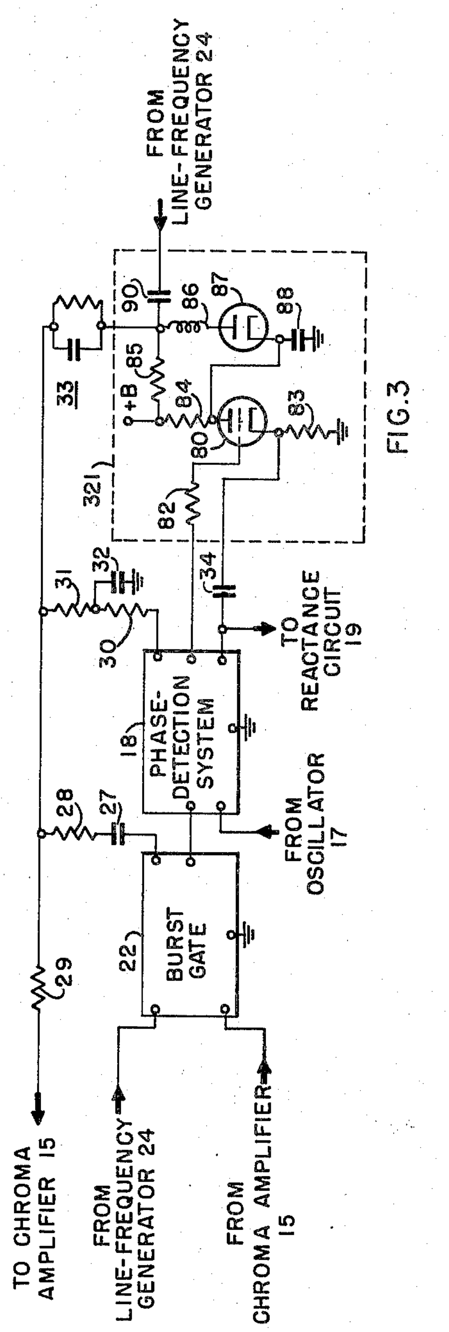
Fig. 3 is another detailed circuit diagram of another embodiment of such control system.

*Description and explanation of operation of multipurpose control system of Fig. 3*

The color-killer circuit in the multipurpose control system of Fig. 2 has both a heterodyne signal and a flyback pulse applied to the grid of the triode therein developing an amplified pulse in the anode circuit and the heterodyne signal in the cathode circuit of the triode. In some receivers it may be undesirable to have a pulse signal applied to the grid of the triode as such pulse signal appears in the cathode circuit with resulting disturbance in the reactance circuit. In the system of Fig. 3, such pulse is not applied to the grid of the triode in the color-killer circuit and, therefore, does not appear in the cathode circuit. Since otherwise the multipurpose control systems of Figs. 2 and 3 are similar, the same units and circuit elements are identified by identical reference numerals.

In the multipurpose control system of Fig. 3, the burst gate 22 and phase-detection system 18 and the circuits coupling such units to the chroma amplifier 15 are identical with corresponding units and circuits in Fig. 2. The color-killer circuit 321 in the system of Fig. 3 differs from the corresponding circuit in Fig. 2. The color-killer circuit 321 includes a triode 80 having a grid input circuit coupled through an isolating resistor 82 to the output circuit of the synchronous detector in the phase-detection system 18. The cathode circuit of the triode 80 may be a complex impedance-matching circuit, such as employed with respect to the triode 64 in Fig. 2, or may comprise a simple load resistor 83 as in the unit 321 of Fig. 3. Such cathode output circuit is coupled through the condenser 34 to an input circuit of the reactance circuit 19. The anode circuit of the triode 80 includes not only a conventional anode load resistor 84 but also includes in parallel therewith a series circuit of a load resistor 85, an inductor 86, and a diode 87 with the cathode of the diode coupled to the anode of the triode 80 and also coupled through an isolating condenser 88 to ground. The line-frequency generator 24 is coupled through a condenser 90 to the junction of the resistor 85 and inductor 86. The output circuit including the network 33 is also coupled to this point.

Considering now the operation of the color-killer circuit 321 of Fig. 3, as described with reference to the system of Fig. 2, a bias potential of maximum negative magnitude, for example of approximately −15 volts, is applied to the grid of the triode 80 when the oscillator 17 is synchronized and, similarly, a small positive potential, for example a potential of +2 volts, is applied to this grid when the oscillator 17 is not synchronized. Additionally, as described with reference to Fig. 2, when the oscillator 17 is not synchronized, a heterodyne signal resulting from the mixing of the locally generated and color burst signals in the synchronous detector of the system 18 is applied to the grid of the triode 80. When the oscillator 17 is synchronized and the negative bias is applied to the grid of the triode 80, no output signals appear in either the anode or cathode output circuits thereof. The reason for there being no output signal in the cathode circuit is obvious when no current flows in the triode 80. The reason for there being no output potential in the anode circuit at this time is not as obvious and will be explained. If no current flows in the triode 80, both terminals of the resistor 84 are at approximately +B potential. Consequently, both the anode and cathode of the diode 87 must be at approximately +B potential at this time. Therefore, any negative-going flyback pulses applied through the condenser 90 and the inductor 86 to the anode circuit of the diode 87 cause no current to flow through this diode and cause no change in potential across the output resistor 85. Consequently, no output signal is developed at the junction of the resistor 85 and the inductor 86.

When the oscillator 17 is not synchronized and a positive bias potential is applied to the grid of the triode 80, current flows in such triode and the heterodyne signals applied to the grid thereof are developed across the cathode load resistor 83 and applied through the condenser 34 to the input circuit of the reactance circuit 19 to improve the pull-in of the oscillator 17 in the manner described with reference to Fig. 2. Since current flows through the triode 80 at this time, a potential drop is developed across the anode load resistor 84 causing the terminal coupled to the anode of the tube 80 to be somewhat less positive than +B. Due to the inherent nature of a diode poled as the diode 87, current flows therethrough resulting in a potential drop across the resistor 85 and both the anode and cathode thereof must also be at approximately the less positive potential on the anode of the triode 80. Consequently, when negative flyback pulses are applied through the condenser 90 and the inductor 86 to the anode of the diode 87, the diode is momentarily rendered nonconductive and the potential at the junction of the resistor 85 and the inductor 86 is momentarily raised to approximately +B. After termination of the negative flyback pulse, the diode 87 again becomes conductive and the potential at the junction of the resistor 85 and inductor 86 again returns to a magnitude somewhat less than +B. Consequently, the application of the negative flyback pulse to the diode circuit causes a positive voltage pulse to be developed across the resistor 85 and this voltage pulse is applied through the network 33 and the resistor 29 to the gain-control circuit of the amplifier 15 to increase the gain therein at a time when the color burst is being translated therethrough, thereby to increase the magnitude of the color burst signal translated through the gate 22 and applied to the phase-detection system 18.

The operation of the anode circuit of the triode 80 to provide high-amplitude positive pulses when the oscillator 17 is not synchronized and substantially no signal when the oscillator 17 is synchronized does not cause flyback pulses or other pulses to be developed in the cathode circuit of such triode. Only the desired heterodyne signal is developed in such cathode circuit for application to the reactance circuit 19.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier responsive to said gating pulse and said one heterodyne signal and having a pair of output circuits; means for conditioning said amplifier when said supplied signals are at different frequencies to be conductive for developing an amplified gating pulse in one of said output circuits and said one heterodyne signal in said other output circuit; means for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

2. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; a line-frequency generator for supplying a horizontal flyback pulse substantially coincident with said burst signal; an amplifier responsive to said pulse and said one heterodyne signal and having a pair of output circuits; means for conditioning said amplifier when said supplied signals are at different frequencies to be conductive for developing an amplified pulse in one of said output circuits and said one heterodyne signal in said other output circuit; means for utilizing said amplified pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

3. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier having one input circuit responsive to said gating pulse and said one heterodyne signal and having a pair of output circuits; means for conditioning said amplifier when said supplied signals are at different frequencies to be conductive for translating said gating pulse for developing an amplified gating pulse in one of said output circuits and said one heterodyne signal in said other output circuit; means for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

4. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier having a grid input circuit responsive to said gating pulse and said one heterodyne signal and having cathode and anode output circuits; means for conditioning said amplifier when said supplied signals are at different frequencies to be conductive for translating said gating pulse for developing an amplified gating pulse in said anode output circuit and said one heterodyne signal in said cathode output circuit; means for utilizing said amplified gating pulse to increase the intensity of said supplied color burst signal for improving the operation of said phase-detection means when said supplied signals are at different frequencies; and means for combining said one heterodyne signal developed in said cathode output circuit and said other heterodyne signal to develop a frequency-control signal when said supplied signals are at different frequencies.

5. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier having one input circuit responsive to said gating pulse, another input circuit responsive to said one heterodyne signal, and having a pair of output circuits; means for conditioning said amplifier when said supplied signals are at different frequencies to be conductive for developing an amplified gating pulse in one of said output circuits and said one heterodyne signal in said other output circuit; means for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

6. A multipurpose control ssytem for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier having an input circuit responsive to said one heterodyne signal and having a pair of output circuits one of which includes a unidirectionally conductive device responsive to said gating pulse; means for conditioning said amplifier when said supplied signals are at different frequencies to be conductive for causing said unidirectionally conductive device to be conductive for developing an amplified gating pulse in said one output circuit and said one heterodyne signal in the other of said output circuits; means for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

7. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier having a grid input circuit responsive to said one heterodyne signal, having an anode output circuit including a unidirectionally conductive device responsive to said gating pulse, and having a cathode output circuit; means for conditioning said amplifier when said supplied signals are at different frequencies to be conductive for causing said unidirectionally conductive device to be conductive for developing an amplified gating pulse in said anode output circuit and said one heterodyne signal in said cathode output circuit; means for utilizing said amplified gating pulse to increase the intensity of said supplied color burst signal for improving the operation of said phase-detection means when said supplied signals are at different frequencies; and means for combining said one heterodyne signal developed in said cathode output circuit and said other heterodyne signal to develop a frequency-control signal when said supplied signals are at different frequencies.

8. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals and including an output circuit for developing a negative unidirectional potential when said signals are synchronized and a less negative unidirectional potential when said signals are not synchronized; means for supplying a gating pulse substantially coincident with said burst signal; an amplifier responsive to said gating pulse and said one heterodyne signal and having a pair of output circuits; a circuit coupling said amplifier to said output circuit of said phase-detection means for utilizing said less negative potential to condition said amplifier when said supplied signals are at different frequencies to be conductive for developing an amplified gating pulse in one of said output circuits and said one heterodyne signal in said other output circuit; means for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

9. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier responsive to said gating pulse and said one heterodyne signal and having a pair of output circuits; means for conditioning said amplifier when said supplied signals are at different frequencies to be conductive for developing an amplified gating pulse in one of said output circuits and said one heterodyne signal in said other output circuit; a chroma amplifier having a gain-control circuit coupled to said one output circuit for utilizing said amplified gating pulse to increase the intensity of said supplied color burst signal for improving the operation of said phase-detection means when said supplied signals are at different frequencies; and means for combining said one heterodyne signal developed in said other output circuit and said other heterodyne signal to develop a frequency-control signal when said supplied signals are at different frequencies.

10. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals; means for supplying a gating pulse substantially coincident with said burst signal; an amplifier responsive to said gating pulse and said one heterodyne signal and having a pair of output circuits; means for conditioning said amplifier when said supplied signals are at different frequencies to be conductive for developing an amplified gating pulse in one of said output circuits and said one heterodyne signal in said other output circuit; means for utilizing said amplified gating pulse to increase the intensity of said supplied color burst signal for improving the operation of said phase-detection means when said supplied signals are at different frequencies; and a reactance circuit responsive to said one heterodyne signal developed in said other output circuit and said other heterodyne signal to control the frequency of said locally generated signal when said supplied signals are at different frequencies.

11. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals and including an output circuit for developing a negative unidirectional potential when said signals are synchronized and a less negative unidirectional potential when said signals are not synchronized; a line-frequency generator for supplying a horizontal flyback pulse substantially coincident with said burst signal; an amplifier having a grid input circuit responsive to said one heterodyne signal, having an anode output circuit including a unidirectionally conductive device responsive to said flyback pulse, and having a cathode output circuit; a circuit coupling said amplifier to said output circuit of said phase-detection means for utilizing said less negative potential to condition said amplifier when said supplied signals are at different frequencies to be conductive for causing said unidirectionally conductive device to be conductive for developing an amplified pulse in said anode output circuit and said one heterodyne signal in said cathode output circuit; a chroma amplifier having a gain-control circuit coupled to said anode output circuit for utilizing said amplified pulse to increase the intensity of said supplied color burst signal for improving the operation of said phase-detection means when said supplied signals are at different frequencies; and a reactance circuit responsive to said one heterodyne signal developed in said cathode output circuit and said other heterodyne signal to control the frequency of said locally generated signal when said supplied signals are at different frequencies.

12. A multipurpose control system for a color-television receiver comprising: means for supplying a locally generated signal of controllable phase and a color burst synchronizing signal of reference phase; phase-detection means responsive to said signals for developing therefrom one heterodyne signal representative of the in-phase and another heterodyne signal representative of the quadrature-phase relationship of said supplied signals and including an output circuit for developing a negative unidirectional potential when said signals are synchronized and a less negative unidirectional potential when said signals are not synchronized; a line-frequency generator for supplying a horizontal flyback pulse substantially coincident with said burst signal; an amplifier having a grid input circuit responsive to said flyback pulse and said one heterodyne signal and having cathode and anode output circuits; a circuit coupling said amplifier to said output circuit of said phase-detection means for conditioning said amplifier when said supplied signals are at different frequencies to be conductive for translating said flyback pulse for developing an amplified pulse in said anode output circuit and said one heterodyne signal in said cathode output circuit; a chroma amplifier having a gain-control circuit coupled to said anode output circuit for utilizing said amplified pulse to increase the intensity of said supplied color burst signal for improving the operation of said phase-detection means when said supplied signals are at different frequencies; and a reactance circuit responsive to said one heterodyne signal developed in said cathode output circuit and said other heterodyne signal to control the frequency of said locally generated signal when said supplied signals are at different frequencies.

References Cited in the file of this patent

UNITED STATES PATENTS 2,594,380 Barton ---------------- Apr. 29, 1952
2,653,187 Luck ------------------ Sept. 22, 1953
2,714,132 Fredendall ------------ July 26, 1955